Figure 1:
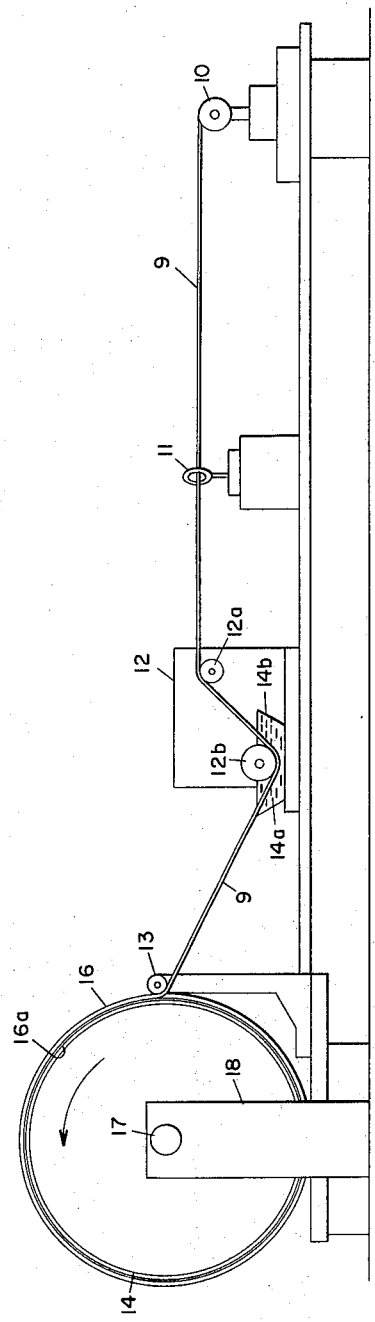

United States Patent [19]

Bullock

[11] 3,770,539
[45] Nov. 6, 1973

[54] PROCESS FOR MANUFACTURING RESIN-FILAMENT COMPOSITES

[75] Inventor: Frederick C. Bullock, Cumberland, Md.

[73] Assignee: Hercules Incorporated, Wilmington, Del.

[22] Filed: Aug. 11, 1969

[21] Appl. No.: 848,778

[52] U.S. Cl................ 156/155, 156/161, 156/171, 156/176, 156/308, 156/436, 161/143
[51] Int. Cl.......................... B32b 5/08, B32b 27/06
[58] Field of Search................... 161/143, 144, 172, 161/170; 156/155, 161, 162, 171, 174, 176, 177, 178, 179, 298, 305, 307, 313, 436, 308

[56] References Cited
UNITED STATES PATENTS

| | | | |
|---|---|---|---|
| 2,826,237 | 3/1958 | Carlson | 156/436 |
| 3,472,730 | 10/1969 | Frigstad | 161/144 |
| 3,516,888 | 6/1970 | Bahner | 161/162 |
| 3,573,151 | 3/1971 | Dawbarn | 156/178 X |
| 3,578,489 | 5/1971 | Gelb | 161/170 X |
| 3,628,991 | 12/1971 | Thiele et al. | 161/170 X |
| 3,629,026 | 12/1971 | Isham et al. | 156/161 |
| 3,660,197 | 2/1972 | Morgan et al. | 156/178 X |
| 3,681,185 | 8/1972 | Gelb | 161/143 |

*Primary Examiner*—Harold Ansher
*Attorney*—Michael B. Keehan

[57] ABSTRACT

An improvement is provided in process for manufacture of resin-filament composites from one or more filamentary strands, which comprises impregnating the strand(s) with a solvent for the resin, thereafter laying out the solvent-impregnated strand on a film of the resin, and then removing the solvent to provide residual composite as product.

Product, so produced, is also provided.

Further, a system is provided for manufacture of the composite product, including mandrel winding means, a filament strand supply means, and means intermediate the filament strand supply and the mandrel for contacting the strand with solvent for the solvent-impregnation.

14 Claims, 2 Drawing Figures

PATENTED NOV 6 1973

3,770,539

FREDERICK C. BULLOCK
INVENTOR

S Grant Stewart

BY

ATTORNEY

PROCESS FOR MANUFACTURING RESIN-FILAMENT COMPOSITES

This invention relates to the manufacture of resin-filament composites, and to composite product so produced. In one aspect this invention relates to a process for the manufacture of resin-filament composites from one or more strands of filament in which a solvent for the resin is incorporated into the strand(s), prior to resin-strand contact, to provide product having improved resin distribution, tack, and strand spacing characteristics. In another aspect this invention relates to process above described, in which the strand(s) is formed from high modulus filaments, and is contacted with a solvent for the resin and thereafter wound onto a mandrel and onto a film of the resin, supported thereon, to form a tape, or broad goods, as the composite product. In still another aspect this invention relates to process, above described, in which the strand(s) utilized, is a yarn, or roving, formed from carbon filaments, generally of the graphitized type. In yet another aspect this invention relates to high modulus filament type broad goods, or tape, having improved resin distribution, tack, and strand spacing characteristics. In yet another aspect this invention relates to a system for the manufacture of composite product above described. Other aspects will be apparent in light of the accompanying disclosure and the appended claims.

In the manufacture of unidirectional resin-filament composites, generally as a product of filament-resin type winding on a mandrel, two basic techniques have been utilized, viz. (1) wet fabrication and (2) film fabrication. In the wet technique the filamentary material is first contacted with the liquid resin after which the wet filamentary material is wound onto the mandrel; and in the film technique the filamentary material is wound into a resin film supported on the mandrel. The choice of technique has generally been determined by the particular resin and filamentary material utilized. The filamentary material is generally in form of a strand(s) of yarn or roving in those instances in which the physical properties of the individual filaments are considered to be unfavorable to a mandrel winding operation.

However, due to various physical characteristics of the strand and particularly the twist of the yarn, the individual filaments therein often become so closely packed that a large proportion of the voids that must be impregnated, are blocked, and accordingly the composite product has in numerous instances been unsatisfactory from the standpoint of high void content, and especially so when the strand is of the graphitized carbon type.

This invention is concerned with the manufacture of broad goods and tape, and with product so produced, from one or more filament strands, in which the resin impregnation of each strand is accomplished under conditions providing low void content together with improved accuracy and control of resin content, tack, and uniformity of strand spacing.

In accordance with the invention an improvement is provided in process for the manufacture of unidirectional resin-filament composites, from a filament strand(s), which comprises impregnating said strand(s) with a solvent for said resin and thereafter unidirectionally laying out the resulting solvent-impregnated strand on a film of said resin, whereby a resulting solvent-resin mixture extends from said film into said strand(s) in impregnating relationship with said strand(s), and then removing said solvent from said solvent-resin mixture to provide residual composite as product of the process. In preferred practice, the residual composite product is heated, generally under pressure, to increase its tack to a predetermined degree to make it further suitable for lamination.

Although a single filament strand is generally laid out on the resin film in practice of the invention, a plurality of such strands can be laid out, in parallel, onto the resin film, when desired.

The solvent-impregnated strand(s) can be laid down on the film surface in any suitable manner. However, in preferred practice the filament strand(s) to be utilized is drawn through a body of the resin solvent and then onto a film of the resin supported on a mandrel. The strand(s) is secured at one end to the mandrel and is drawn, by rotation of the mandrel, from a supply source through the resin solvent and onto the resin film, generally at level winding, i.e. at about 90° to a plane containing the mandrel longitudinal axis.

The resin forming the film can be any suitable resin utilized in the filamentary winding art, exemplary of which are epoxy novolaks, polyimides, and epoxies of the two well known types, viz. the bis-phenol epichlorohydrin and the bis-(epoxy-cyclopentyl) ether types. The bis-phenol epichlorohydrin type generally has a molecular weight within the range of 280–12,000 (140–6,000 epoxy equiv.), preferably in the range of 280–600 (140–300 epoxy equiv.), and the bis-(epoxycyclopentyl) ether type generally has a molecular weight within the range of about 180–1,000 (90–500 epoxy equiv.), preferably in the range of 180–700 (90–375 epoxy equiv.).

The resin film, onto which the solvent-impregnated strand(s) is laid, can be of any suitable thickness although for most applications the thickness will generally be that inherent in an amount of film of from about 0.015 to 0.040 lbs/ft$^2$.

The resin solvent is any suitable solvent that can dissolve or soften the necessary amount of resin for the formation of the impregnating resin solution, or mixture, generally at ambient temperatures, e.g. 20°–30°C., exemplary of which are methylethyl ketone, acetone, ethanol, toluene, and mixtures thereof. One such solvent mixture often utilized in an equal proportion mixture of methylethyl ketone, ethanol and toluene. It is important that the strand(s) be substantially saturated with the solvent so as to facilitate maximum flow of the impregnating resin-solvent mixture, as it is formed, into substantially all voids and into contact with the filament surfaces.

The filament strand is generally a yarn, or a tow, the tow type strand being generally preferred inasmuch as the substantially parallel relationship of the individual filaments more suitably (than the yarn) provides for access of the impregnating solvent and solvent-resin mixture into the spaces between the filaments, and hence there often results a somewhat greater uniformity of resin distribution throughout the reinforcing strands and a greater uniformity of strength throughout the entire body of composite product. The strand in any event contains any suitable number of individual filaments, often in the order of from 700 to 10,000 filaments.

Reference is made to the drawings which are diagrammatic and illustrate the invention which is, in preferred practice, applied to high modulus filament strands, more often carbon filaments which have been graphitized in accordance with known practice. Thus, FIG. 1 illustrates a now preferred winding system including a mandrel, and process, and FIG. 2 illustrates an enlarged view of the resin film and support therefor on the mandrel surface.

Figure 2:
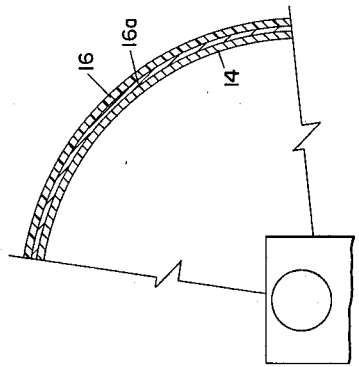

Referring to FIG. 1, a single strand 9 of graphite filament yarn, or tow, is level drawn from supply spool 10 through guide 11, solvent impregnation zone 12, and along guide wheel 13 onto a cylindrical mandrel 14 having a diameter in the order of from about 12 to 60 inches and onto resin film 16 supported on, and entirely around, mandrel 14. Film 16 is a suitable resin layer, e.g. an epoxy novolak, of say about 0.026 lbs/ft$^2$ adhered to a suitable release paper, or cloth, 16a, having a thickness of about 0.5 mm which in turn is supported on mandrel 14 under slight tension, by any suitable means, such as by tape or vacuum. An enlarged view of a section of mandrel 14 together with film 16 and support 16a therefor is shown with reference to FIG. 2, wherein like parts of FIG. 1 are designated by like numbers. As more completely shown with reference to FIG. 1, the paper backed resin layer 16 extends completely around mandrel 14 on the exterior surface thereof and is of such length that its ends approach each other in abutting relationship and are secured to the mandrel surface under slight tension by tape along the line of the abutting ends.

Resin solvent 14a, in tray type solvent container 14b, in solvent impregnation zone 12 is any suitable normally liquid solvent for resin 16 and is present in container 14b in an amount correlated with the rate of drawing, of strand 9 onto mandrel 14, so as to provide the desired residence time for strand-solvent contact in container 14b. For example, in the particular system, when the cross section of mandrel 14 is say 32 inches, and the graphite strand is formed from about 1,440 filaments, the volume of solvent 14a in tray 14b is advantageously about 200 cc's, and the residence time of strand 9 in solvent 14a is controlled by the rate of rotation of mandrel 14 which in turn is set so as to provide a filament winding rate of from about 60 to 150 ft. per minute.

Direction of travel of strand 9 through zone 12 is maintained by roller guides 12a and 12b. Conventional drive means, not specifically illustrated, is supported by upright member 18 and connects with mandrel axis 17 for rotation of the mandrel 14 about its longitudinal axis in the direction shown by the arrow. Strand 9, extending from spool 10 to mandrel 14 and secured at its opposite ends to spool 10 and mandrel 14, is maintained under suitable slight tension by spool assembly 10 in conjunction with guides 12a and 12b so as to wind strand 9 onto mandrel 14, with integrity of strand-solvent contact.

In operation of the embodiment of FIG. 1, a sheet of selected resin is supported as a coating on a paper strip, and the strip is then supported on the mandrel external surface as illustrated with reference to FIG. 2 showing release paper sheet 16a, as a "backing" for film 16, fitted to mandrel 14 directly against the mandrel surface.

The guide system for leading the strand onto the film 16, see guide wheel 13, is then adjusted to convey the strand 9 onto the mandrel and onto the film 16 at the predetermined spacing. Strand 9 is then secured to mandrel 14 under the desired tension, say 20 to 1,000 grams, by suitably positioning spool 10 as a tension device, after which the strand winding is initiated. The winding rate, as above described, is regulated to provide the required residence time of contact of strand 9 in the solvent body 14a.

Generally, there is excess solvent on the external surface of the strand as it exits from solvent contact in zone 12, and it is therefore often advantageous to space the solvent impregnation zone from the mandrel sufficiently to allow the excess solvent to drip from the strand before the strand is wound onto the mandrel-supported resin film. Although a small amount of excess solvent on the strand surface is not adverse to the winding operation an undue excess of solvent in the strand often leads to nonuniformity of resin distribution throughout the broad goods product with accompanying variance in broad goods strength and tack. Generally if not more than about 1 inch of the winding, as measured axially along the mandrel from the point at which the strand is led onto the mandrel, shows excess solvent on the exterior strand surface, and thus a "shiny" liquid coating on that portion of the winding, the strand has not been "over-saturated" with solvent, and hence an even resin distribution will result. Thus, as a routine control for locating the solvent impregnator zone 12 away from the mandrel, one can refer to the length of " shiny" portion above described and as long as that length is not more than about 1 to 2 inches there is assurance that uniformity of distribution of resin, and suitable tack, will be obtained.

At the end of the winding step, the solvent is evaporated from the resulting broad goods product while still on the mandrel, in any suitable manner, such as by merely allowing the mandrel to stand for at least 45 minutes to an hour to evaporate the solvent. After the evaporation, the individual rounds of graphite yarn are firmly fixed in position, and the residual broad goods (or tape, as the case may be) on backing support 16a is then removed from the mandrel simply by cutting through the winding, and backing, to the mandrel surface to disengage the final composite product from the mandrel.

The resulting composite product generally of 1 strand thickness (a single winding of the strand on the mandrel) is then ready for its intended use, although in preferred practice it is subjected to heating under elevated temperature and pressure conditions for improvement of tack, and is then held in storage for subsequent use. When the composite product is removed from the mandrel it is advantageously covered at its exposed surface with a second sheet of "backing" of release type paper for protection, and is then heated, e.g. at 200°F. and 200 p.s.i. for about 3 minutes, after which it is placed in storage, preferably with both release paper backings in place until the product is ready for the intended use; the final heating step, in substantially all embodiments, providing for additional tack of the composite of "prepreg" product and, in some instances, for further resin flow throughout the composite product for additional product strength in the direction of 90° to the fiber direction.

Generally the resin content of the composite is from 35 to 50 percent, a content within the range of from 38 to 45 percent often being obtained.

There are several features of the invention which contribute to the low void content of the resin-filament composite of the invention. Thus the impregnating solvent acts on the resin film to dissolve at least a portion of the resin and hence to at least soften substantially the entire film portion in contact with the solvent impregnated strand(s) and a wicking action of the impregnating solvent, on the resulting solvent-resin mixture, provides uniform flow of the resin (as a resin-solvent mixture component) into the void spaces in the strand. Further, the resin, as the impregnating resin solution, moves into the filament strand(s) from the film surface toward the exterior surface of the strand, and hence the resin flow displaces any air particles present in the wet strand to reduce possibilities for gas pockets and accompanying strength defects. Also, the rate of flow of impregnating resin mixture is sufficiently low as to substantially eliminate all possibilities for air entrainment in the composite product during the resin-solvent impregnation step.

In preferred practice, the conditions for solvent impregnated strand-resin film contact, particularly in respect of contact temperature and the amount of solvent, are correlated to provide for solution, in the solvent, of from about 60–95, more often from about 75–90, percent of the resin film. In this manner, the back, or unexposed, side of the film can be sufficiently retained as a solid to maintain optimum degree of integrity of the film, as a whole, during the contact and solvent removal steps.

The process of the invention provides for improved spacing of the filament strand(s) on the resin film inasmuch as the strand(s) is machine placed and then more firmly held by the resin film than by conventional liquid resin systems which allow more strand movement after alignment of the strand on the film.

Although any suitable filament strand can be utilized in practice of the invention, for example a strand formed from filaments of asbestos, glass, beryllium, carbon, boron, and the like, the invention in preferred practice is applied to the utilization of high modulus filamentary strands, and particularly to high modulus strands of graphite filaments. Graphite filament strands preferably utilized are those in which the filament is prepared by oxidation, carbonization and graphitization steps utilizing suitable organic precursors such as cellulosics and polyacrylonitriles, all in accordance with known practice.

The process of the invention provides for production speeds in the order of 500 feet per minute and higher which are higher than those of wet impregnation systems, which are generally below about 100 feet per minute inasmuch as at high speeds of these systems, air is introduced into the resin strands.

When referring herein to strands of high modulus filament it is meant those having modulus values in the order of say 40 to 80 million pounds per square inch; and often the tensile strength of those filaments is in the range of say from 200,000 to 350,000 pounds per square inch.

By way of further illustration of the invention, a broad goods composite was made in accordance with process specifically illustrated with reference to FIG. 1 from each of 5 graphite yarns utilizing methyl ethyl ketones as the resin solvent and a conventionally utilized epoxy type filament winding resin, viz. BP-907, a bisphenol epichlorohydrin, manufactured by American Cyanamid. Each graphite yarn contained in the order of from 1,440 filaments and was formed by carbonization and graphitization of a suitable organic precursor material, and each broad goods product was laminated to a thickness of 0.08 inch under the same conditions of heat, pressure, temperature and time. Each laminate was tested for flexure, and shear, strength. In each instance the laminate specimen showed a short beam shear strength span to depth ratio of 5:1. The flexure strengths were measured over a 4-inch span with a 4-point loading. The tests are summarized as follows:

|  | The individual filaments | | | The laminate | |
| --- | --- | --- | --- | --- | --- |
| Graphite yarn | Modulus p.s.i. × $10^6$ | Density grams/cc | Tensile strength M p.s.i. | Flexure strength M lbs. | Shear strength M p.s.i. |
| Thornel 50 [1] | 50 | 1.63 | 285 | 120 | 5.6 |
| Thornel 25 [1] | 25 | 1.43 | 180 | 110 | 6.5 |
| HITCO HMG 50 [1] | 50.7 | 1.72 | 287 | 120 | 7.8 |
| Morganite Type 1 [2] | 55–65 | 1.97 | 200–300 | 110 | 8.0 |
| Courtaulds [2] | 50–60 | 1.92 | 250–325 | 145 | 8.9 |

[1] A cellulosic type precursor.
[2] A polyacrylonitrile precursor.

As will be evident to those skilled in the art, various modifications can be made or followed, in light of the foregoing disclosure and discussion without departing from the spirit or scope of the disclosure or from the scope of the claims.

What I claim and desire to protect by Letters Patent is:

1. In a process for the manufacture of a resin-filament composite from at least one filament strand, the improvement comprising impregnating said strand(s) with a solvent for said resin and thereafter unidirectionally laying out the resulting solvent-impregnated strand(s) on a film of said resin, whereby a resulting solvent-resin mixture extends from said film into said strand(s) in impregnating relationship with said strand(s), and then removing said solvent from said solvent-resin mixture to provide residual composite as product of the process.

2. In the manufacture of broad goods, or tape, by winding at least one strand of filaments onto a mandrel in contact with a resin supported on said mandrel, the improvement comprising impregnating said strand(s) with a solvent for said resin and then winding the resulting solvent-impregnated strand(s) onto a film of said resin supported as described, and thereafter removing said solvent from the resulting winding to form said broad goods, or tape, as residual product.

3. In a process of claim 2, dissolving in said solvent from about 65–95 weight percent of said resin during said winding.

4. A process of claim 2 wherein said strand(s) is a bundle of high modulus filaments.

5. A process of claim 4 wherein said resin is of the epoxy type.

6. A process of claim 4 wherein said solvent is at least one selected from the group consisting of methyl ethyl ketone, toluene, acetone, and ethanol.

7. In a process of claim 6, drawing a strand(s) of from about 1,400 to 10,000 graphite filaments through a body of said solvent and then onto said resin film when formed from 0.015 to 0.040 pounds per square foot of an epoxy type resin, at a rate of from about 20 to 200 feet per minute, and under a tension of from 10 to 1,000 grams.

8. A process of claim 4 wherein said strand(s) is a bundle of carbon filaments.

9. A process of claim 8 wherein said strand(s) is a bundle of graphite filaments.

10. In a process of claim 9, extending said strand(s) under tension, from a supply source therefor through a body of said solvent and then onto said resin film.

11. A process of claim 10 wherein said strand(s) is a yarn.

12. A process of claim 10 wherein said strand(s) is a tow, or roving.

13. In a process of claim 10, level winding said strand(s) onto said resin film.

14. In a process of claim 13, supporting resulting broad goods, or tape, product under elevated temperature and pressure conditions for a sufficient period of time to increase tack thereof.

* * * * *